(12) United States Patent
Watanabe et al.

(10) Patent No.: US 10,436,572 B2
(45) Date of Patent: Oct. 8, 2019

(54) THREE-DIMENSIONAL SHAPE MEASURING APPARATUS, THREE-DIMENSIONAL SHAPE MEASURING PROBE

(71) Applicant: Hitachi, Ltd., Chiyoda-ku, Tokyo (JP)

(72) Inventors: Masahiro Watanabe, Tokyo (JP);
Tatsuo Hariyama, Tokyo (JP);
Masayuki Kobayashi, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 15/747,789

(22) PCT Filed: Mar. 30, 2016

(86) PCT No.: PCT/JP2016/060373
§ 371 (c)(1),
(2) Date: Jan. 26, 2018

(87) PCT Pub. No.: WO2017/168628
PCT Pub. Date: Oct. 5, 2017

(65) Prior Publication Data
US 2019/0011249 A1    Jan. 10, 2019

(51) Int. Cl.
*G01B 11/00* (2006.01)
*G01B 9/02* (2006.01)
*G01B 11/24* (2006.01)
*G01B 11/26* (2006.01)

(52) U.S. Cl.
CPC ...... *G01B 9/02091* (2013.01); *G01B 11/2441* (2013.01); *G01B 11/26* (2013.01)

(58) Field of Classification Search
CPC ...... G03F 7/70633; G03F 9/70; G03F 9/7076; G03F 9/7088; G03F 9/7049

USPC ........................................................ 356/401
See application file for complete search history.

(56) References Cited

U.S. PATENT DOCUMENTS

| 2008/0021275 A1 | 1/2008 | Tearney et al. |
| 2009/0244547 A1 | 10/2009 | Ozawa |
| 2010/0053312 A1 | 3/2010 | Watanabe et al. |
| 2010/0157308 A1 | 6/2010 | Xie |

(Continued)

FOREIGN PATENT DOCUMENTS

| JP | 1-308906 A | 12/1989 |
| JP | 11-56786 A | 3/1999 |

(Continued)

OTHER PUBLICATIONS

International Search Report (PCT/ISA/210) issued in PCT Application No. PCT/JP2016/060373 dated Jun. 14, 2016 with English translation (5 pages).

(Continued)

*Primary Examiner* — Md M Rahman
(74) *Attorney, Agent, or Firm* — Crowell & Moring LLP

(57) ABSTRACT

An object of the present invention is to provide a compact and highly-accurate three-dimensional shape measurement apparatus. The three-dimensional shape measurement apparatus according to the present invention causes a part of a measurement light to proceed in a direction which is different from a direction with respect to a subject as an angle measurement light, and detects a rotation angle using the angle measurement light.

14 Claims, 13 Drawing Sheets

(56) References Cited

U.S. PATENT DOCUMENTS

| | | | | |
|---|---|---|---|---|
| 2011/0261368 A1* | 10/2011 | Ohtomo | ................ | G01S 7/4812 |
| | | | | 356/607 |
| 2011/0310377 A1* | 12/2011 | Ohishi | .................... | G01S 7/497 |
| | | | | 356/5.01 |
| 2012/0057149 A1* | 3/2012 | Ohzawa | ............. | A61B 1/00147 |
| | | | | 356/51 |
| 2013/0107208 A1* | 5/2013 | Endo | ........................ | A61B 3/14 |
| | | | | 351/206 |
| 2016/0278636 A1* | 9/2016 | Fukuma | ................. | A61B 3/132 |
| 2016/0341545 A1* | 11/2016 | Yamazaki | .......... | G01B 9/02076 |

FOREIGN PATENT DOCUMENTS

| | | |
|---|---|---|
| JP | 2008-191021 A | 8/2008 |
| JP | 2009-244232 A | 10/2009 |
| JP | 2012-10913 A | 1/2012 |
| JP | 2015-6427 A | 1/2015 |
| WO | WO 2008/065955 A1 | 6/2008 |
| WO | WO 2010/128605 A1 | 11/2010 |

OTHER PUBLICATIONS

Japanese-language Written Opinion (PCT/ISA/237) issued in PCT Application No. PCT/JP2016/060373 dated Jun. 14, 2016 (4 pages).

* cited by examiner

THREE-DIMENSIONAL SHAPE MEASURING APPARATUS, THREE-DIMENSIONAL SHAPE MEASURING PROBE

TECHNICAL FIELD

The present invention relates to a technology for optically measuring a three-dimensional shape of a subject.

BACKGROUND ART

A method for scanning a distance measurement beam is known as a method for detecting a three-dimensional shape of a micro part. For example, in a case where a method referred to as Optical Coherence Tomography (OCT) is used, it is possible to detect light reflected or scattered after a beam-shaped light hits on a subject and it is possible to acquire intensity and a distance of the reflected or scattered light. In a case where a beam scan mechanism is formed to be inserted into a narrow part and a beam is revolved, it is possible to form a probe which measures a sectional shape of the narrow part.

In PTL 1 below, a separate flexible tube, which rotates and has an internal optical fiber, is inserted into an inner side of a flexible tube and the flexible tube on the inner side is rotated, with the result that a reflecting prism at a tip of the flexible tube which rotates on the inner side is rotated, and thus a measurement beam is revolved. Here, there is a case where the reflecting prism does not rotate at a uniform speed because torsion occurs on the rotation tube. Here, in PTL 1, a mark formed at a position, through which a beam penetrates, of a transparent part of a tip part of the tube on the outside is simultaneously detected by the measurement beam, and thus an angle of the beam is corrected.

In PTL 2 below, in a probe to be inserted into a micro part, a minute motor is installed which rotates a mirror used to reflect an OCT detection beam guided through an optical fiber in a horizontal direction. Generally, it is difficult to incorporate an angle detection encoder into the minute motor. Therefore, in PTL 2, light, which is different from the OCT detection beam, is guided through a separate optical fiber, a rotation angle of the motor is detected based on strength of a reflected light, and an angle of measurement data is corrected.

CITATION LIST

Patent Literature

PTL 1: JP-A-11-056786
PTL 2: JP-A-2015-006427

SUMMARY OF INVENTION

Technical Problem

In PTL 1, since the angle detection mark is formed on the same optical path as the measurement beam, there is a possibility that angle correction accuracy is lowered because the beam is deflected due to the mark. In PTL 2, it is necessary to guide a beam, which is different from the distance measurement beam, from a measurement processing unit to a tip part of the probe for detection of an angle of the rotation mirror, and, in addition, it is necessary to individually provide a detector and a processing unit in order to sense the strength of the reflected light, and thus there is a tendency for a system to be complicated.

The present invention is made in consideration of the above problems, and an object of the present invention is to provide a compact and highly-accurate three-dimensional shape measurement apparatus.

Solution to Problem

According to the present invention, the three-dimensional shape measurement apparatus causes a part of the measurement light to proceed in a direction, which is different from a direction with respect to the subject, as an angle measurement light, and detects a rotation angle using the angle measurement light.

Advantageous Effects of Invention

According to the three-dimensional shape measurement apparatus of the present invention, it is possible to measure a highly-accurate three-dimensional shape with a compact and simple structure.

DESCRIPTION OF EMBODIMENTS

First Embodiment

Figure 1:
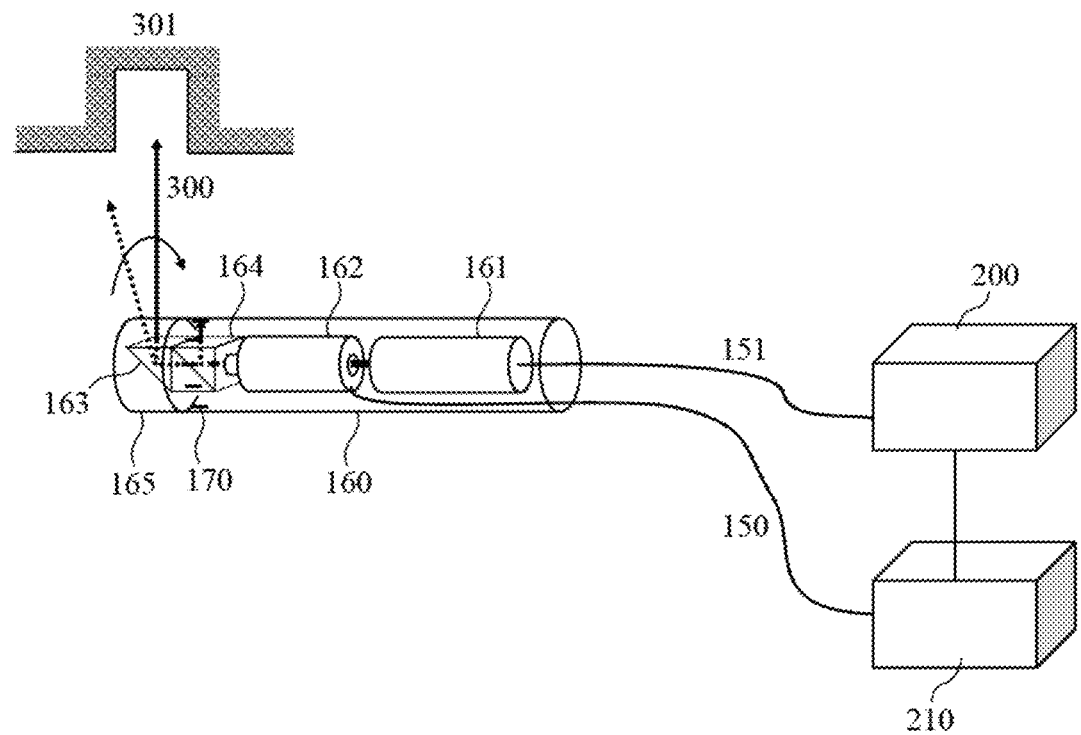
FIG. 1 is a diagram illustrating a configuration of a three-dimensional shape measurement apparatus 100 according to a first embodiment.

FIG. 1 is a diagram illustrating a configuration of a three-dimensional shape measurement apparatus 100 according to a first embodiment of the present invention. The three-dimensional shape measurement apparatus 100 is an apparatus which measures a three-dimensional shape of a measurement target 301 by measuring a distance up to a point on the measurement target 301, on which a beam hits, while rotating a measurement beam 300. The three-dimensional shape measurement apparatus 100 includes a measurement probe 160, an emission optical system/detection optical system 200, and a control device 210. Operations the measurement probe 160, the emission optical system/detection optical system 200, and the control device 210 will be described later with reference to FIG. 4.

The measurement probe 160 accommodates an optical fiber collimator 161. The optical fiber collimator 161 receives a detection light emitted by the emission optical system/detection optical system 200 via an optical fiber, and generates the narrowed measurement beam 300. The light generated by the optical fiber collimator 161 progresses in order of a motor 162, a half mirror 164, and a mirror 163, goes toward the measurement target 301 by the mirror 163, and is reflected as the measurement beam 300. The motor 162 has a hollow and the light passes through a hole thereof. Since the motor 162 causes the half mirror 164 and the mirror 163 to rotate according to a control signal received from a control line 150, the measurement beam 300 rotates. The measurement beam 300 penetrates a transparent part 165 of the measurement probe 160 and arrives at the measurement target 301. The light, which is reflected or scattered by the measurement target 301, returns through the same optical path, and enters the optical fiber 151 from the optical fiber collimator 161. The emission optical system/detection optical system 200 converts the returned light into an electric signal, and the control device 210 calculates the distance up to the measurement target 301 by processing the electric signal.

The half mirror 164 (angle detection light generation unit) causes a part of the measurement beam 300 to branch off and to face angle detection markers 170 (angle detection unit). The angle detection markers 170 are marks which are formed of a material that has different reflectivity from the measurement probe 160 or which are engraved as unevenness of a surface. The light, which is reflected or scattered by the angle detection markers 170, is coupled to the measurement beam 300 again via the half mirror 164, and returns to the emission optical system/detection optical system 200 via the optical fiber collimator 161. Therefore, it is possible to simultaneously acquire the distance up to the measurement target 301 and the reflectivity of the angle detection markers 170 or distances up to the angle detection markers 170. In a case where the information is used, it is possible to acquire an accurate 3D shape of the measurement target 301 in such a way that the control device 210 corrects a rotation angle even in a case where a minute motor, in which it is not possible to perform angle detection and accurate control, is used.

Figure 2:
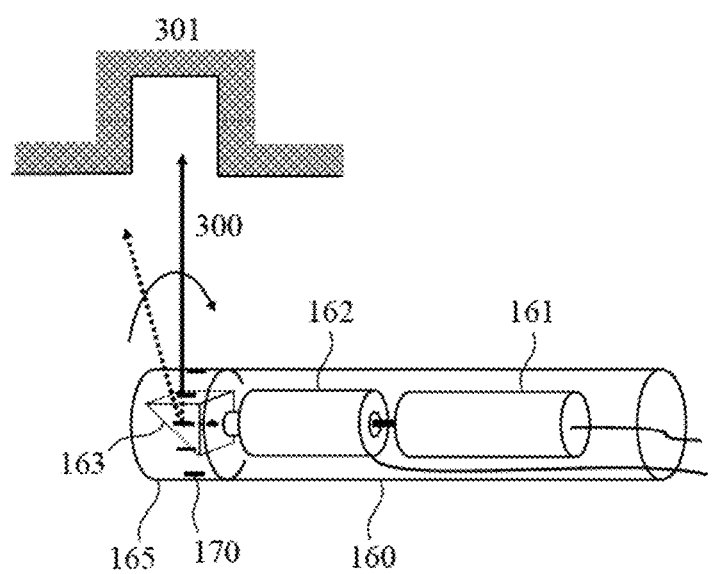
FIG. 2 is a diagram illustrating an example in which angle detection markers 170 are detected while a measurement beam 300 does not branch off according to the related art.

FIG. 2 is a diagram illustrating an example, in which the angle detection markers 170 are detected while the measurement beam 300 does not branch off, according to the related art. In FIG. 2, the beam emitted from the optical fiber collimator 161 is reflected in the mirror 163 as the measurement beam 300, penetrates the transparent part 165 of the measurement probe 160, and arrives at the measurement target 301. The angle detection markers 170 are formed in positions through which the measurement beam 300 of the transparent part 165 penetrates.

Figure 3:
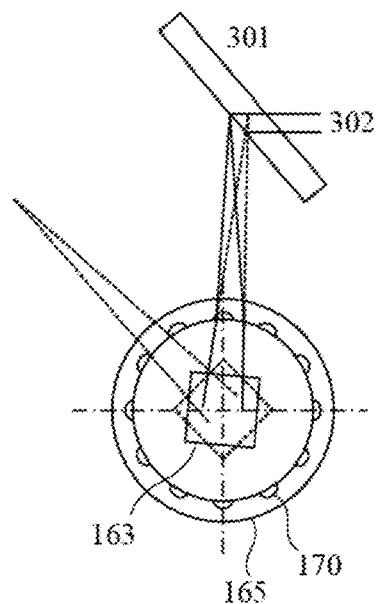
FIG. 3 is a diagram illustrating errors generated due to a configuration illustrated in FIG. 2.

FIG. 3 is a diagram illustrating errors generated due to the configuration of FIG. 2. In a case where the measurement beam 300 passes through unevenness of the angle detection markers 170, the measurement beam 300 is refracted from dotted lines to solid lines. In a case where the measurement target 301 is inclined, a beam irradiation position on the measurement target 301 is deviated, with the result that a distance up to an irradiation point is changed, and thus distance data has errors corresponding to a reference symbol 302.

In contrast, in a case where the measurement beam 300 branches off and irradiation is performed on the angle detection markers 170 as illustrated in FIG. 1, it is possible to avoid the errors due to intervention of the angle detection markers 170 on a measurement optical path. In addition, it is not necessary to perform connection in which light different from a case of distance detection is prepared for angle detection and is sent to the measurement probe 160.

Furthermore, it is not necessary to prepare a detector used to detect an angle detection light in addition to the distance detection.

Figure 4:
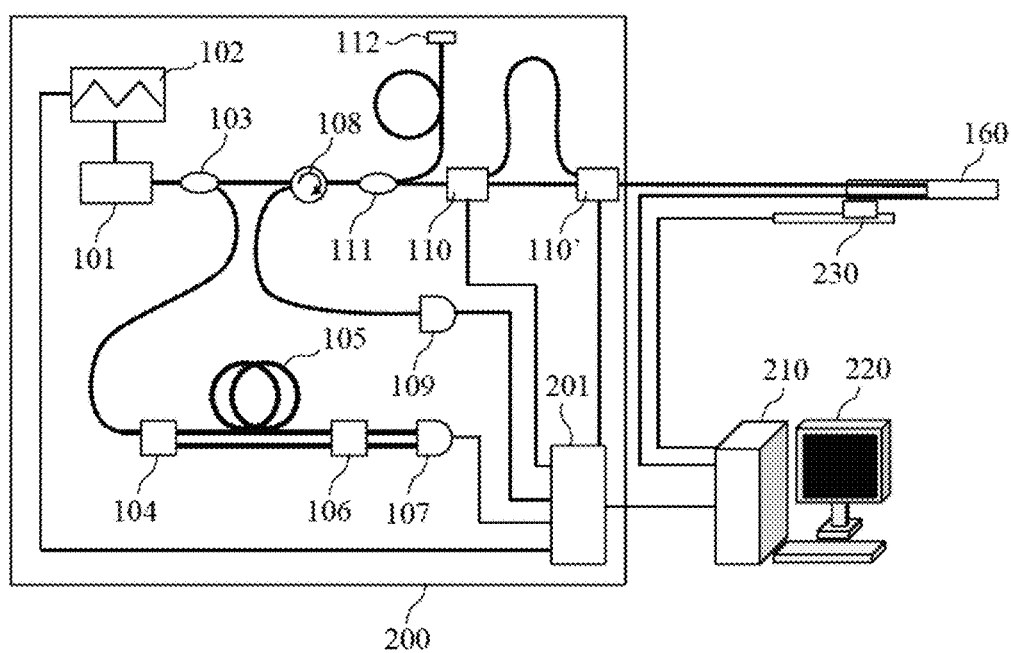
FIG. 4 is a diagram illustrating configurations of an emission optical system/detection optical system 200 and a control device 210.

FIG. 4 is a diagram illustrating configurations of the emission optical system/detection optical system 200 and the control device 210. As a method for measuring the distance up to the measurement target 301, methods referred to as Frequency Modulated Continuous Waves (FMCW) and Swept-Source Optical Coherence Tomography (SS-OCT) have been known. The methods are based on the same principle except that the former is used to measure a long distance using light source in which a coherence distance is long and the latter is mainly used to observe a minute structure using a light source in which the coherence distance is short. FIG. 4 illustrates an example of the configuration using FMCW or SS-OCT.

In a case where a triangular wave current is injected to the laser source 101 from an oscillator 102 and is converted into a driving current, an FM light, on which frequency sweeping is temporally performed at a fixed modulating speed, is generated. Otherwise, in a case where the laser source 101 is formed as a semiconductor laser equipped with an external resonator and a resonant wavelength thereof is changed according to a triangular wave-shaped control signal from the oscillator 102, the FM light, on which frequency sweeping is temporally performed, is generated. The FM light is divided by a fiber coupler 111, irradiation of a part of an output light as the measurement light is performed on the measurement target 301, and a part of the output light is reflected as a reference light in a reference mirror 112. A light, which is acquired by causing the measurement light returned from the measurement target 301 to interfere in the reference light, is detected by a light receiver 109, and a detected beat signal is analyzed. Time, in which the reference light 401 arrives at the light receiver 109, and time, in which the and the measurement light 402 arrives at the light receiver 109, have a difference Δt and a frequency of the light source changes during Δt, and thus a beat signal of a beat frequency fb, which is equivalent to a frequency difference due to Δt, is detected. In a case where a frequency sweep width is set to Δv and time which is necessary to perform modulation corresponding to Δv is set to T, a relationship of the following Equation 1 is provided.

[Number 1]

$$\Delta t = \frac{T}{2\Delta v} f_b \quad (1)$$

A distance L up to the measurement target is a half of a distance in which light travels during Δt, and thus it is possible to perform calculation as in the following Equation 2 using a light velocity c in the atmosphere.

[Number 2]

$$L = \frac{cT}{2\Delta v} f_b \quad (2)$$

The control device 210 transmits a sweep waveform signal with respect to the oscillator 102 via an AD/DA converter 201. According to a signal output by the oscillator 102, an oscillation frequency of the laser source 101 is swept. A part of the light emitted from the laser source 101 is guided to an optical reference system by a fiber coupler 103. In the optical reference system, a laser light further branches off into two parts by a fiber coupler 104, a fixed optical path difference is provided by an optical fiber 105, multiplexing is performed again by a fiber coupler 106, and reception is performed by a light receiver 107. The method corresponds to Mach-Zehnder interferometer. The light receiver 107 detects a fixed beat signal which is proportional to the optical path difference.

The light which is not introduced to the optical reference system passes through a circulator 108, and branches off by the fiber coupler 111. A part of the light is reflected in the reference mirror 112 and becomes the reference light, and irradiation of most of the remaining light is performed on the measurement target 301 via the optical fiber collimator 161. The light reflected in the measurement target 301 passes through the optical fiber collimator 161 again, is merged with the reference light from the reference mirror 112 in the fiber coupler 111, passes through an optical switch 110, and is guided to the light receiver 109 by the circulator 108. A beat signal is generated due to interference of the reference light with the measurement light. The AD/DA converter 201 uses a reference beat signal, which is received by the light receiver 107, as a sample clock, and performs A/D conversion on a measurement beat signal received by the light receiver 109. Otherwise, sampling may be performed on the measurement beat signal received by the light receiver 109 and the reference beat signal received by the light receiver 107 at a fixed sampling clock.

Optical switches 110 and 110' are disposed between the fiber coupler 111 and the optical fiber collimator 161. Functions of the switches will be described. An interference beat is acquired in a case where a difference between an optical path length from the fiber coupler 111 to the reference mirror 112 and an optical path length from the fiber coupler 111 to the measurement target 301 is equal to or shorter than the coherence distance of the laser source 101. Otherwise, it is not possible to perform measurement. Here, it is possible to switch between lengths of the optical fibers (first and second measure optical fibers) between the optical switches 110 and 110' by simultaneously switching between the optical switches 110 and 110' according to the distance up to the measurement target 301.

In contrast, in a case where the coherence distance is long and a difference between the optical path length up to the reference mirror 112 and the optical path length up to the measurement target 301 is too long, the beat frequency becomes too high, and thus it is not possible for the light receiver 109 to perform detection. Here, it is possible to switch between lengths of the optical fibers between the optical switches 110 and 110' by simultaneously switching the optical switches 110 and 110' such that the beat frequency falls in a detectable frequency.

Although the number of switchable optical fiber paths is only two in FIG. 4, three or more optical fibers may be prepared and switched according to a measurement range desired to be covered. The optical switches 110 and 110' may be appropriately switched according to the distance up to the measurement target 301, and the optical switches 110 and 110' may be switched for every rotation in synchronization with, for example, the rotation of the mirror 163.

In FIG. 4, the optical paths are switched by switching between the optical fibers. However, instead, it is possible to switch light using a mirror by once performing conversion into light which is propagated in a free space using the optical fiber collimator or the like, and it is possible to change the optical path lengths by moving a movable mirror.

Switching of the optical switches 110 and 110' is controlled according to a signal from the control device 210 via the AD/DA converter 201.

It is possible to dispose switches, which are the same as the optical switches 110 and 110', on the optical path between the fiber coupler 111 and the reference mirror 112, and it is possible to switch between lengths of the optical fibers (first and second reference optical fibers) between the fiber coupler 111 and the reference mirror 112. Therefore, it is possible to switch a measurement range in the same manner.

The control device 210 analyzes the measurement beat signal and the reference beat signal, which are respectively detected by the light receivers 109 and 107 and are acquired through A/D conversion performed by the AD/DA converter 201, as will be described later. The display device 220 displays a result of the process. The control device 210 acquires sectional shape data by processing data from the measurement probe 160 while controlling a probe feeding mechanism 230 on which the measurement probe 160 is installed, and thus it is possible to acquire a 3D shape of the measurement target 301.

Second Embodiment

In a second embodiment of the present invention, examples of a plurality of configurations of the measurement probe 160 will be described. Since the other configurations are the same as in the first embodiment, a difference relevant to the measurement probe 160 will be mainly described below.

Figure 5A:
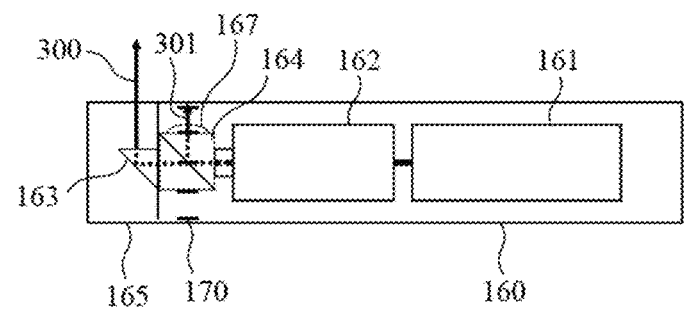
FIG. 5A is a diagram illustrating an example of a configuration of a measurement probe 160 according to a second embodiment.

FIG. 5A is a diagram illustrating an example of a configuration of the measurement probe 160 according to the second embodiment. Although the configuration illustrated in FIG. 5A is approximately the same as in FIG. 1, a fact that a lens 167 is formed at a rear of the half mirror 164 on the optical path is different. The lens 167 is capable of narrowing the angle detection lights which hit on the angle detection markers 170. A signal becomes weak in a case where the pitch of the angle detection markers 170 is narrowed rather than a beam width. However, in a case where the lens 167 narrows the angle detection lights, it is possible to dispose the angle detection markers 170 at a finer pitch. Therefore, it is possible to improve angle correction accuracy.

Figure 5B:
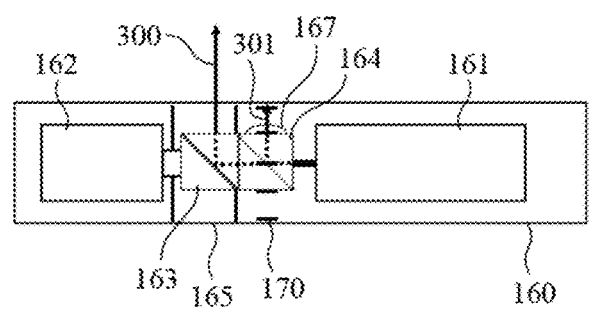
FIG. 5B is a diagram illustrating an example of the configuration of the measurement probe 160 according to the second embodiment.

FIG. 5B is a diagram illustrating an example of the configuration of the measurement probe 160 according to the second embodiment. In FIG. 5B, the motor 162 is disposed in a position (a tip of the measurement probe 160) through which a beam does not pass. A beam emitted from the optical fiber collimator 161 arrives at the half mirror 164 and the mirror 163 without passing through a hollow part of the motor 162. In the configuration, it is possible for the motor 162 to rotate the mirror 163 and the half mirror 164 even though the motor 162 does not include the hollow part. Instead, a wiring used to drive the motor 162 crosses the transparent part 165. Here, the measurement beam 300 may not be blinded in such a way that the measurement beam 300 is caused to be hardly affected by thinning the wiring as much as possible or a transparent electrode formed of a material, such as Indium Tin oxide (ITO: Tin-doped indium oxide), is formed on the transparent part 165.

Third Embodiment

In a third embodiment of the present invention, a plurality of examples in which the angle detection markers 170 are formed will be described. Since the other configurations are the same as in the first embodiment, a difference relevant to the angle detection markers 170 will be mainly described below.

Figure 6A:
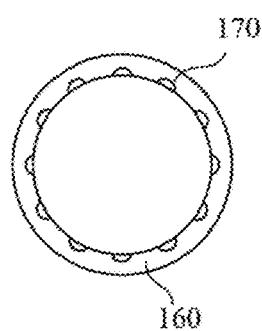
FIG. 6A illustrates an example in which the angle detection markers 170 are formed on an inner wall of the measurement probe 160.

FIG. 6A illustrates an example in which the angle detection markers 170 are formed on an inner wall of the measurement probe 160. It is possible to form the angle detection markers 170 in such a way that a glass tube is prepared and an ablation processing is performed by converging, for example, high-intensity lights, such as yttrium, aluminum, and garnet (YAG) lasers, and performing irradiation on the glass.

Figure 6B:
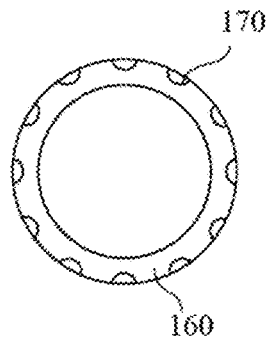
FIG. 6B illustrates an example in which the angle detection markers 170 are formed on an outer wall of the measurement probe 160.

FIG. 6B illustrates an example in which the angle detection markers 170 are formed on an outer wall of the measurement probe 160. Since the same method as in FIG. 6A is used and focal positions of process lasers are adjusted, it is possible to form the angle detection markers 170 on the outside of the glass tube.

Figure 6C:
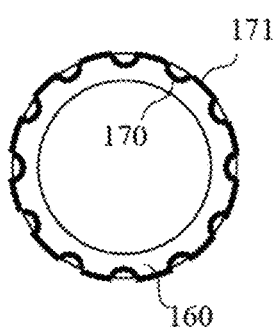
FIG. 6C illustrates an example in which a reflection film 171 is formed on an outside of a glass tube in FIG. 6B.

FIG. 6C illustrates an example in which a reflection film 171 is formed on an outside of the glass tube in FIG. 6B. Due to the reflection film 171, it is possible to improve intensity of an angle detection signal or to prevent the angle detection light from leaking to the outside.

Figure 6D:
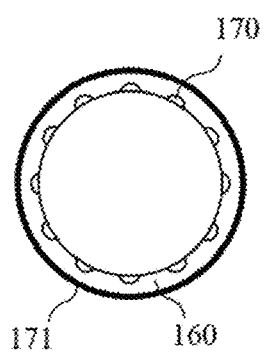
FIG. 6D illustrates an example in which the reflection film 171 is formed on the outside of the glass tube in FIG. 6A.

FIG. 6D illustrates an example in which the reflection film 171 is formed on the outside of the glass tube in FIG. 6A. It is possible to similarly form the reflection film 171 on the outside of the glass tube in a case where the angle detection markers 170 are formed inside the measurement probe 160.

Figure 6E:
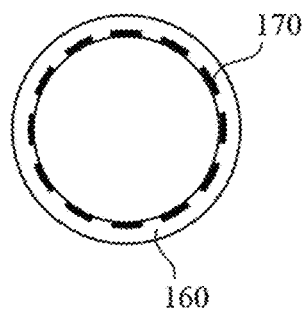
FIG. 6E illustrates an example in which the angle detection markers 170 are formed using the reflection film.

FIG. 6E illustrates an example in which the angle detection markers 170 are formed using the reflection film. In a case where the reflection film is formed in advance and the reflection film is removed by the laser, it is possible to form the angle detection markers 170.

Figure 6F:
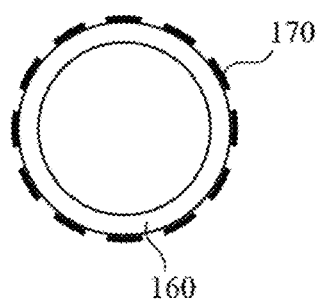
FIG. 6F illustrates another example in which the angle detection markers 170 are formed using the reflection film.

FIG. 6F illustrates another example in which the angle detection markers 170 are formed using the reflection film. After the reflection film is formed in advance and a resist is coated on the reflection film, the resist is exposed by the laser, and the reflection film is etched while using the resist as a mask. Therefore, it is possible to form the angle detection markers 170.

Figure 6G:
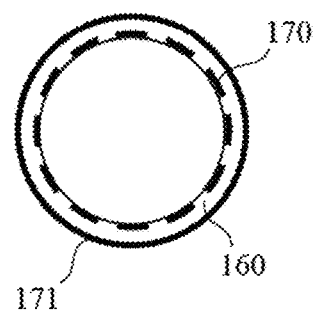
FIG. 6G illustrates an example in which the reflection film 171 is formed on the outside of the glass tube in FIG. 6E.

FIG. 6G illustrates an example in which the reflection film 171 is formed on the outside of the glass tube in FIG. 6E. After the angle detection markers 170 are formed inside the glass tube as in FIG. 6E, the reflection film 171 is formed on the outside of the glass tube, and thus it is possible to prevent the angle detection light from leaking to the outside.

Figure 6H:
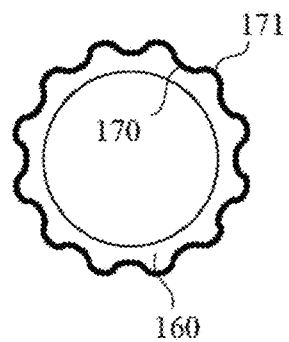
FIG. 6H illustrates an example in which the angle detection markers 170 are formed by performing an unevenness process on a surface shape of the measurement probe 160.

FIG. 6H illustrates an example in which the angle detection markers 170 are formed by performing an unevenness process on a surface shape of the measurement probe 160. In a case where the resist is coated on the outside of the glass tube and the glass is etched using a resist pattern, which is formed in such a way that the resist is exposed by the laser, as the mask, it is possible to form the angle detection markers 170 whose surface shape varies on a sine wave. Furthermore, in a case where the reflection film 171 is formed on the angle detection markers 170, it is possible to realize the angle detection markers 170 which have high angle detection accuracy.

Fourth Embodiment

In a fourth embodiment of the present invention, a plurality of examples of configurations of the measurement probe 160 will be described. Since the other configurations are the same as in the first embodiment, a difference relevant to the measurement probe 160 will be mainly described below.

Figure 7A:
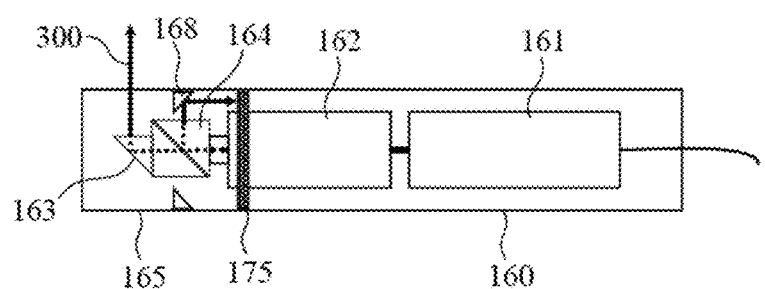
FIG. 7A is a diagram illustrating an example of a configuration of a measurement probe 160 according to a fourth embodiment.

FIG. 7A is a diagram illustrating an example of a configuration of the measurement probe 160 according to the fourth embodiment. The angle detection light which branches off from the measurement beam 300 by the half mirror 164 are reflected in the circular mirror 168, and arrives at an angle detection disk 175 (angle detection unit) which is fixed to the measurement probe 160. The angle detection disk 175 is fixed to the measurement probe 160. The angle detection disk 175 reflects the angle detection light, and the reflected angle detection light passes through the same optical path and returns via the circular mirror 168. In a case where the angle detection light is detected together with the measurement beam 300, it is possible to detect a rotation angle.

Figure 7B:
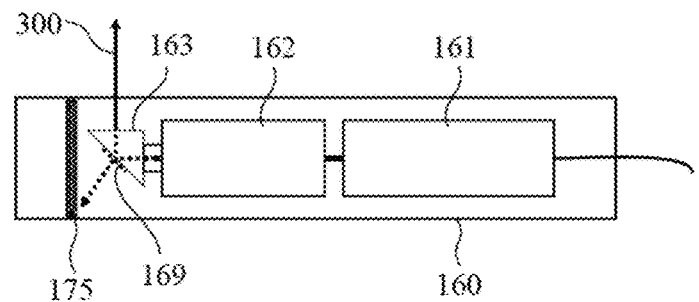
FIG. 7B is a diagram illustrating an example of the configuration of the measurement probe 160 according to the fourth embodiment.

FIG. 7B is a diagram illustrating an example of the configuration of the measurement probe 160 according to the fourth embodiment. In FIG. 7B, a mirror 169 simultaneously generates the measurement beam 300 and the angle detection light. The mirror 169 generates the measurement beam 300 by reflecting light which passes through the motor 162. Furthermore, a diffraction grid is formed on a reflection surface of the mirror 169, and a part of the measurement beam 300 hits the angle detection disk 175 as the angle detection light. The angle detection disk 175 is fixed to the measurement probe 160. The angle detection disk 175 reflects the angle detection light, and the reflected angle detection light passes through the same optical path and returns via the mirror 169. In a case where the angle detection light is detected together with the measurement beam 300, it is possible to detect the rotation angle.

Figure 7C:
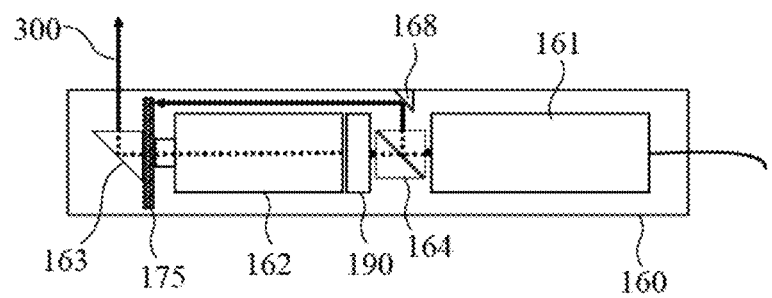
FIG. 7C is a diagram illustrating an example of the configuration in which a half mirror 164 is disposed on a laser side rather than a motor 162 on an optical path.

FIG. 7C is a diagram illustrating an example of the configuration in which the half mirror 164 is disposed on a laser side rather than the motor 162 on the optical path. Before the measurement beam 300 emitted from the optical fiber collimator 161 enters the motor 162, a part of the measurement beam 300 branches off by the half mirror 164 as the angle detection light, is reflected in the circular mirror 168, and irradiation is performed on the angle detection disk 175. The angle detection disk 175 is rotated by the motor 162. The angle detection disk 175 reflects the angle detection light, and the reflected angle detection light passes through the same optical path and returns via the circular mirror 168. In a case where the angle detection light is detected together with the measurement beam 300, it is possible to detect the rotation angle.

In FIG. 7C, a focusing mechanism 190 is disposed immediately after the measurement light penetrates through the half mirror 164. Due to the focusing mechanism 190, it is possible to control a focus of the measurement light according to the distance up to the measurement target 301. As the focusing mechanism 190, it is possible to use a mechanism which controls distances between a plurality of lenses, and it is possible to use a liquid lens which is capable of electrically changing a curvature of the lens. In a case where the liquid lens is used, the optical path length of the measurement light changes according to a focal position, and thus it is necessary to correct a result of the distance detection corresponding to the change. Therefore, a function for correction is provided in the control device 210. In a case where the focusing mechanism 190 is used, it is necessary to provide a control line used to control the focal position, which is not illustrated in the drawing, of the focusing mechanism 190 between the focusing mechanism 190 and the control device 210.

Figure 7D:
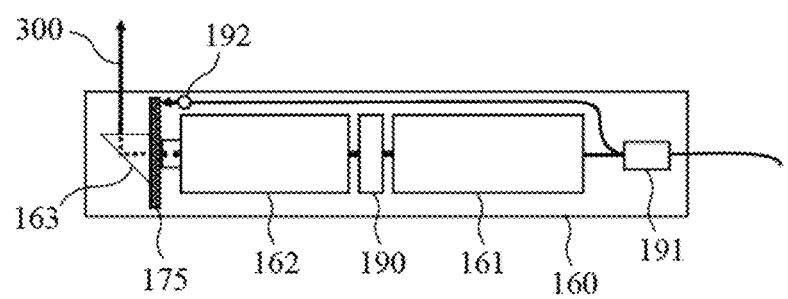
FIG. 7D illustrates a modified example of FIG. 7C.

FIG. 7D is a modified example of FIG. 7C. A part of the measurement light branches off to another optical fiber (branching optical fiber) by an optical fiber coupler 191 (angle detection light generation unit) before passing through the optical fiber collimator 161. A lens (for example, a ball lens) 192 is disposed at a tip of a branching optical fiber. Otherwise, the lens 192 may be directly formed at the tip of the optical fiber. A light emitted from the lens 192 hits on the angle detection disk 175. The angle detection disk 175 is rotated by the motor 162. The angle detection disk 175 reflects the angle detection light, the reflected angle detection light returns through the same optical path via the optical fiber coupler 191. In a case where the angle detection light is detected together with the measurement beam 300, it is possible to detect the rotation angle.

Figure 7E:
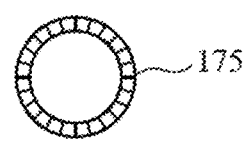
FIG. 7E is a front view illustrating an angle detection disk 175.

FIG. 7E is a front view illustrating the angle detection disk 175. Radial angle detection marks are formed on a surface of the angle detection disk 175. It is possible to form the angle detection marks by the same process as described with reference to FIG. 6.

Fifth Embodiment

In a fifth embodiment of the present invention, an example of a signal process performed by the control device 210 will be described. Since the other configurations are the same as in the above embodiments, the signal process performed by the control device 210 will be mainly described.

Figure 8:
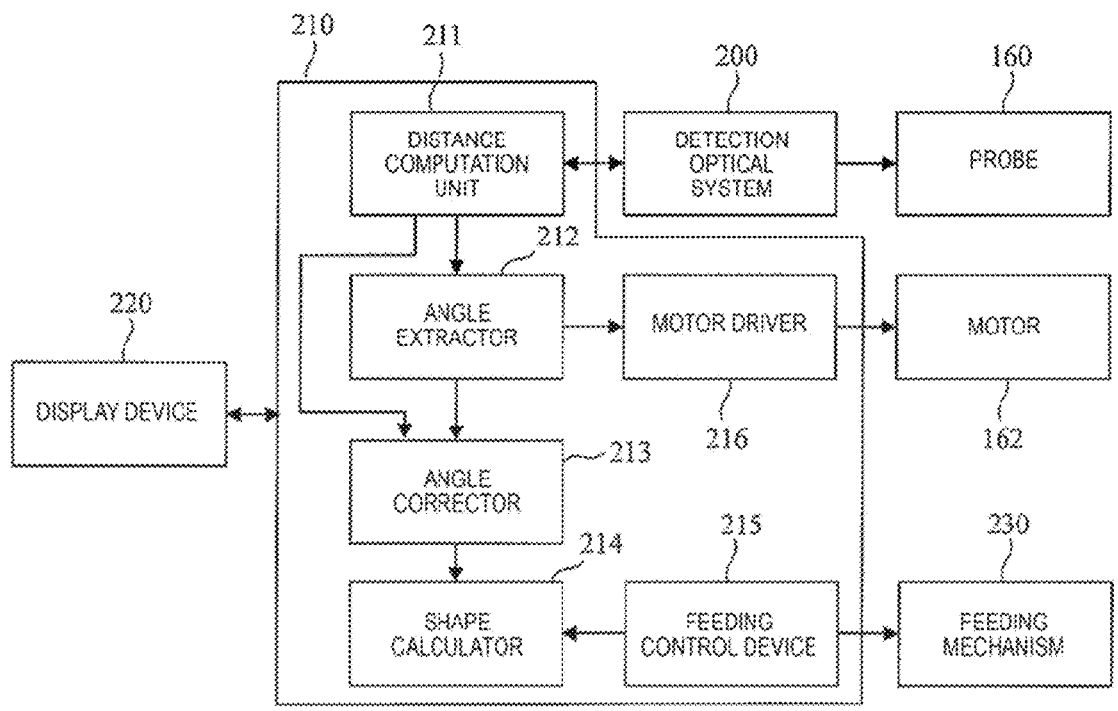
FIG. 8 is a block diagram illustrating a configuration of the control device 210.

FIG. 8 is a block diagram illustrating a configuration of the control device 210. A distance computation unit 211 processes the measurement beat signal and the reference beat signal which are respectively detected by the light receivers 109 and 107. In a case where Hilbert transformation is performed on the reference beat signal, it is possible to produce a signal whose phase is shifted by 90 degrees. Since it is possible to acquire a local phase of a signal based on the reference signal acquired before and after the Hilbert transformation is performed, it is possible to acquire timing at which the reference signal has a fixed phase by interpolating the phase. In a case where interpolation sampling is performed on the measurement beat signal in accordance with the timing, it is possible to perform resampling on measurement signals based on the reference signal. Otherwise, the same result may be acquired in a case where A/D conversion is performed by performing sampling on the measurement signals while using the reference beat signal as a sampling clock in the AD/DA converter 201.

The distance computation unit 211 performs Fast Fourie Transformation (FFT) on the measurement signals acquired as described above, and acquires peak positions and sizes of resulting measurement signals. The peak positions and the sizes respectively correspond to reflection positions and reflected light quantities of the measurement target 301. In normal OCT, it is desired to visualize a scattering position and a scattering magnitude of a translucent body (for example, an organism), and thus an amplitude spectrum of the FFT is used without change. However, in the present invention, it is desired to accurately acquire the position of a surface of the measurement target 301, a resolution of the distance detection is improved by performing an interpolating process as illustrated in FIG. 9 which will be described later.

A motor driver 216 controls drive of the motor 162. A feeding control device 215 controls drive of the probe feeding mechanism 230. Operations of other functional units included in the control device 210 will be described later.

Figure 9:
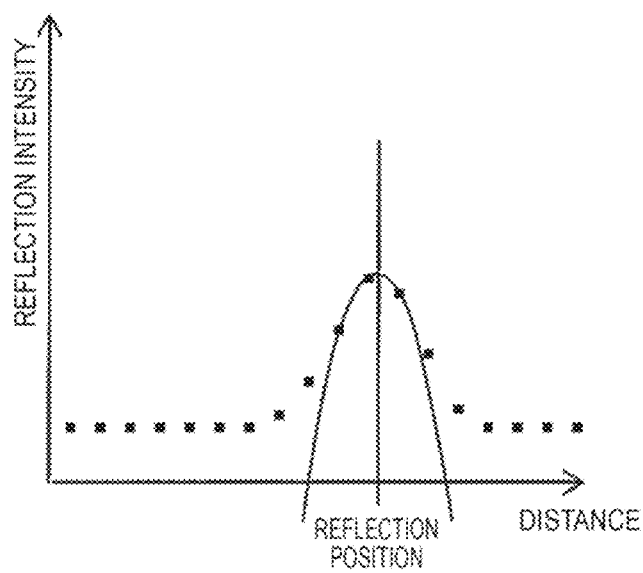
FIG. 9 is a graph illustrating an interpolating process performed by a distance computation unit 211.

FIG. 9 is a graph illustrating the interpolating process performed by the distance computation unit 211. In FIG. 9, a horizontal axis corresponds to a frequency of FFT and a vertical axis corresponds to reflection intensity. In the vicinity of a peak of the reflection intensity, results of the measurement become discrete, as illustrated in FIG. 9. An interval between dots, that is, the resolution of the distance is $c/(2\Delta v)$. In a case of a wavelength of 1300 nm and a sweep width of 100 nm which are general as SS-OCT, $\Delta v=17.8$ THz, and thus the resolution of the distance $c/(2\Delta v)=8.4$ μm. In a case of a wavelength of 1500 nm and a sweep width of 2 nm which are general as FMCW, $\Delta v=267$ GHz, and thus the resolution of the distance $c/(2\Delta v)=0.56$ mm. In contrast, as illustrated in FIG. 9, it is possible to increase the resolution to the extent of 1/10 by interpolating three or more points in the vicinity of the peak using a quadratic function or a Gaussian function and by using the peak of the function after interpolation.

Figure 10A:
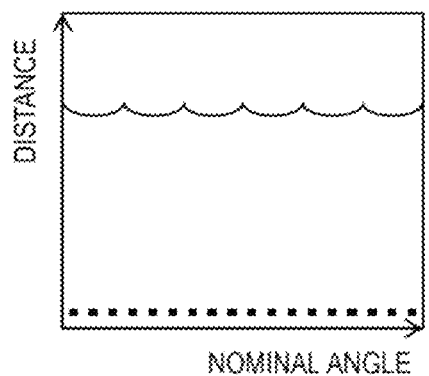
FIG. 10A is a schematic diagram illustrating distance data which is acquired in such a way that the distance computation unit 211 measures one cycle of an inner side of a regular hexagonal pipe.

FIG. 10A is a schematic diagram illustrating the distance data which is acquired in such a way that the distance computation unit 211 measures one cycle of an inner side of a regular hexagonal pipe. In a case where the angle detection markers 170 or the angle detection disk 175 are formed such that high-reflectivity marks are disposed for respective predetermined angles as illustrated in, for example, FIGS. 6A, 6B, 6E, and 6F, the distance data as in FIG. 10A is acquired.

The distance computation unit 211 performs FFT as described above for respective wavelength sweeps. In a case where plotting is performed in such a way that acquired distance distribution is set to a vertical axis and angles (where, nominal angles because it is difficult to accurately understand the angle of the motor 162) of the measurement beam 300 corresponding to the respective wavelength sweeps are set to a horizontal axis, data of waves, in which six $1/\cos \theta$ are connected, is acquired as illustrated in FIG. 10A. In a case where the data is interpolated as illustrated in FIG. 9, the distance data corresponding to the respective angles is acquired. The distance computation unit 211 sends the acquired distance data to an angle corrector 213.

An angle extractor 212 extracts actual angles of the respective nominal angles using FFT data used by the distance computation unit 211. Specifically, the angles are extracted using signals observed on a lower side of FIG. 10A. The signals correspond to angle measurement lights which are reflected from the angle detection markers 170 or the angle detection disk 175.

Figure 10B:
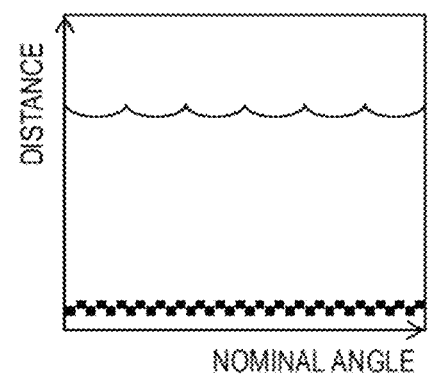
FIG. 10B is a schematic diagram illustrating the distance data which is acquired in such a way that the distance computation unit 211 measures one cycle of the inner side of the regular hexagonal pipe.

FIG. 10B is a schematic diagram illustrating the distance data which is acquired in such a way that the distance computation unit 211 measures one cycle of the inner side of the regular hexagonal pipe. In a case where the angle detection markers 170 or the angle detection disk 175 is formed such that the distances up to the marks are periodically switched, for example, as illustrated in FIGS. 6C, 6D, and 6G, the distance data as illustrated in FIG. 10B is acquired. The configuration described in FIG. 6H is similar to FIG. 10B and results of the angle detection more smoothly change in a sine wave shape.

Figure 10C:
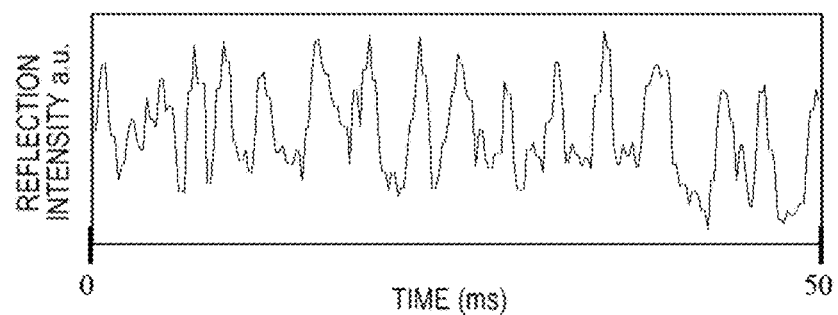
FIG. 10C is a graph illustrating a projecting process performed by an angle extractor 212.

FIG. 10C is a graph illustrating a projecting process performed by the angle extractor 212. The angle extractor 212 extracts data in a range where signals reflected from the angle detection markers 170 or the angle detection disk 175 exist among the distance data of FIG. 10A, and sums up FFT amplitudes in a distance direction, that is, the reflection intensity. Therefore, the horizontal axis is set to time (nominal angle) and the vertical axis is set to the reflection intensity, and thus data as in FIG. 10C is acquired.

Figure 10D:
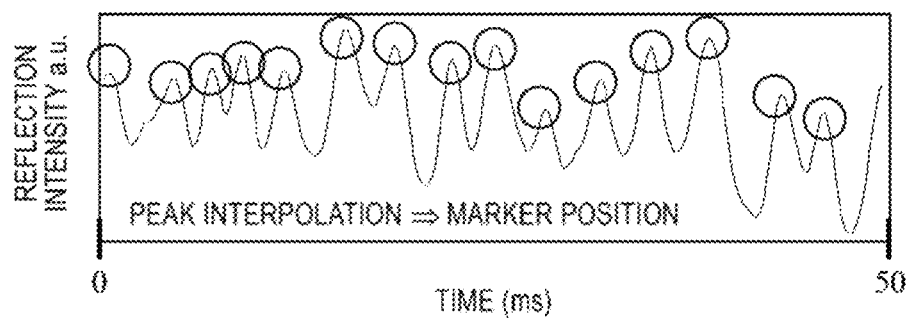
FIG. 10D is a graph illustrating data acquired by performing flattening on FIG. 10C.

FIG. 10D is a graph illustrating data acquired by performing flattening on FIG. 10C. The angle extractor 212 performs flattening on data of FIG. 10C using a method, such as moving average, in a direction of time. Therefore, data in a smooth sine wave shape as illustrated in FIG. 10D is acquired. The angle extractor 212 acquires respective peaks of the waveforms, and thus it is possible to specify the positions of the marks.

Figure 10E:
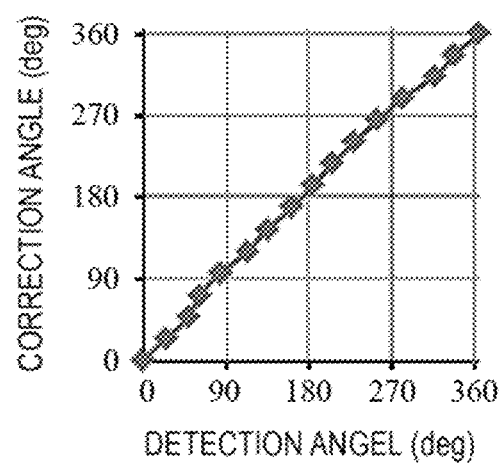
FIG. 10E is a graph illustrating results in which angles corresponding to respect time of FIG. 10D are acquired.

FIG. 10E is a graph illustrating results in which angles corresponding to respect time of FIG. 10D are acquired. The angle extractor 212 performs interpolation on the peak positions acquired in FIG. 10D using a method, such as linear interpolation or spline interpolation, and thus it is possible to acquire actual angles corresponding to respective time. As a result, data indicative of correspondence of the nominal angles and corrected angles is acquired as illustrated in FIG. 10E.

In a case where data as illustrated in FIG. 10B is acquired as the distance data, data which is the same as in FIG. 10C is acquired by performing the projecting process, which is the same as the process performed with respect to FIG. 10A, for upper half or lower half of the signals reflected from the markers. Otherwise, in a case where projection data corresponding to FIG. 10C is acquired in such a way that the same projecting process is performed on the upper half and the lower half of the signals reflected from the markers, respectively, and a difference between upper-half projection data and lower-half projection data is calculated, the peaks are emphasized, and thus an S/N ratio increases. Furthermore, in a case where the interpolating process which is the same as in FIG. 9 is performed with respect to signal waveforms reflected from the markers as another method, it is possible to acquire the distance data up to the markers, which corresponds to FIG. 10C. However, in this case, the vertical axis of the graph is not set to the reflection intensity but is set to the distances up to the markers. Even in this case, it is possible to perform the processes described with reference to FIGS. 10D and 10E in the same manner as in the case where the vertical axis of the graph is set to the reflection intensity.

The angle corrector 213 acquires the sectional shape data in which the angles are corrected using the distance data at respective measurement points acquired by the distance computation unit 211 and the corrected angles of the respective measurement points acquired by the angle extractor 212. It is possible for the shape calculator 214 to acquire a 3D shape of the measurement target 301 using the sectional shape data acquired by the angle corrector 213 and the probe position data acquired from the feeding control device 215. The display device 220 displays the acquired sectional shape and the 3D shape.

Figure 11A:
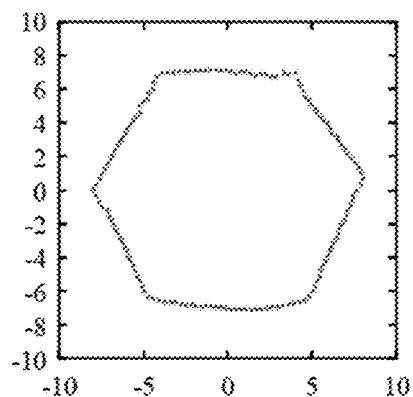
FIG. 11A illustrates an example of sectional shape data in which an angle of the measurement beam 300 is not corrected.

FIG. 11A illustrates an example of the sectional shape data in which the angle of the measurement beam 300 is not corrected. Here, similar to FIGS. 10A to 10E, sectional shape data, acquired in a case where the inner side of the regular hexagonal pipe is measured, is illustrated.

Figure 11B:
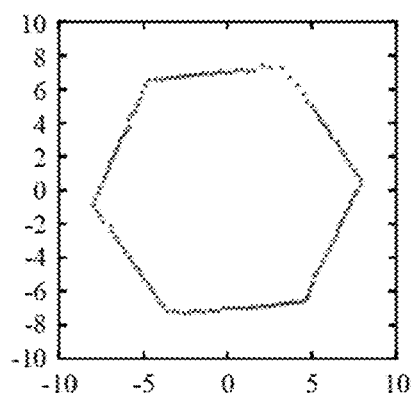
FIG. 11B illustrates an example in which sectional shape data is measured in a case where the angle detection markers 170 are disposed on an optical path of the measurement beam 300.

FIG. 11B illustrates an example in which the sectional shape data is measured in a case where the angle detection markers 170 are disposed on the optical path of the measurement beam 300. In this case, the angles are corrected by the angle detection markers 170. In contrast, the measurement beam 300 is discorded according to the angle detection markers 170 as illustrated in FIG. 2, and thus the cross-sectional shapes are discorded at spots where the measurement beam 300 crosses the marks.

Figure 11C:
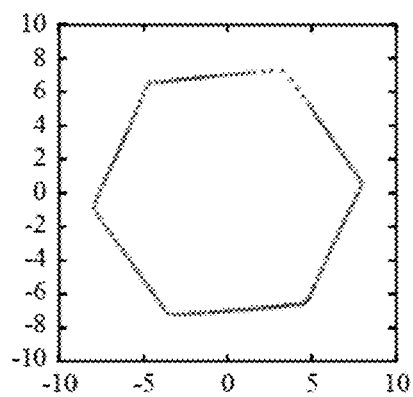
FIG. 11C illustrates an example of the sectional shape data in which the angle of the measurement beam 300 is corrected.

FIG. 11C illustrates an example of the sectional shape data in which the angle of the measurement beam 300 is corrected. Since angles are corrected with respect to FIG.

11A and the measurement beam 300 does not cross the marks, the disorder of the sectional shape is suppressed.

Sixth Embodiment

In the first embodiment, the method using FMCW and SS-OCT is described as the method for measuring the distance up to the measurement target 301. Methods referred to as Fourier-Domain (FD)-OCT and white confocal detection also exist as another method for measuring the distance. Even in a case where the methods are used, it is possible to display the same effect as in the first to fifth embodiments. In a sixth embodiment of the present invention, an example of a configuration will be described.

Figure 12:
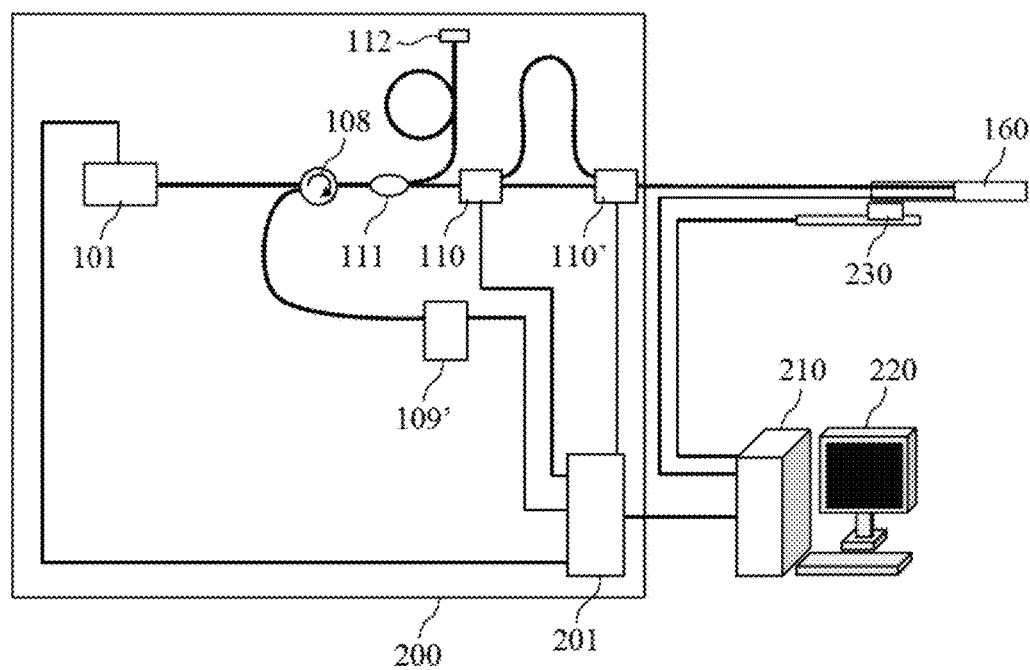
FIG. 12 is a diagram illustrating configurations of an emission optical system/detection optical system 200 and a control device 210 according to a sixth embodiment.

FIG. 12 is a diagram illustrating configurations of the emission optical system/detection optical system 200 and the control device 210 according to the sixth embodiment. Hereinafter, the emission optical system/detection optical system 200 will be mainly described based on difference from the first to fifth embodiments.

In FD-OCT, a wideband light source is used as the laser source 101 instead of a wavelength sweep laser. In FIG. 12, a reference beat detection system, in which light is caused to branch off in the fiber coupler 103 and is detected by the light receiver 107, does not exist. The light passes through the circulator 108, branches off by the fiber coupler 111, and a part of the light becomes a reference light after being reflected in the reference mirror 112 and irradiation of most of remaining parts is performed on the measurement target 301 by the optical fiber collimator 161. The light reflected from the measurement target 301 passes through the optical fiber collimator 161 again, merges with the reference light from the reference mirror 112 in the fiber coupler 111, and is guided up to a spectroscope 109' by the circulator 108. In the spectroscope 109', spectrum data, which vibrates due to the interference of the reference light and the measurement light, is generated. The AD/DA converter 201 performs A/D conversion on the spectrum data output by the spectroscope 109'. Subsequent processes are the same as in the fifth embodiment.

In the white confocal detection, the optical fiber for the reference optical path, which branches off in the fiber coupler 111, and the reference mirror 112 are not necessary in FIG. 12. In addition, since it is not possible for the emission optical system/detection optical system 200 to switch a detection range, the optical switches 110 and 110' which switch between the optical path lengths are not necessary. In order to perform the white confocal detection, a lens, which is intentionally designed such that chromatic aberration is large, is used as the optical fiber collimator 161. Therefore, the focal position of the optical fiber collimator 161 changes according to a wavelength, and only lights condensed on the measurement target 301 return to the optical fiber collimator 161 again. In a case where detection is performed by the spectroscope 109', signals are acquired for only wavelengths corresponding to reflection and scattering distances on the measurement target 301. Therefore, it is not necessary for the distance computation unit 211 to perform FFT, and the detected spectrum data corresponds to data in FIGS. 9, 10A, and 10B. Subsequent processes are the same as in the fifth embodiment.

Seventh Embodiment

Figure 13A:
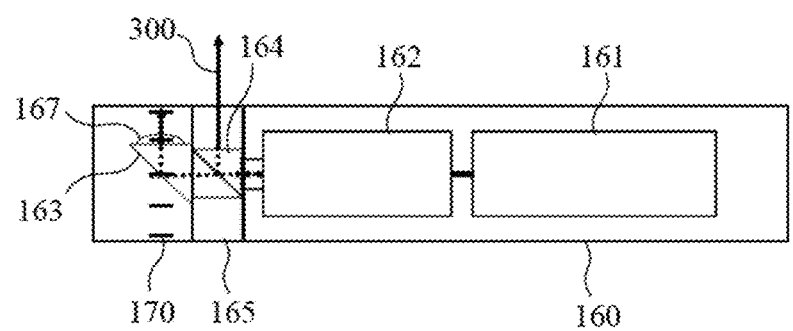
FIG. 13A illustrates an example of a configuration of a measurement probe 160 according to a seventh embodiment.

FIG. 13A illustrates an example of a configuration of a measurement probe 160 according to a seventh embodiment of the present invention. In FIG. 13A, a fact that the angle detection markers 170 are disposed around the mirror 163 is different from FIG. 1. Therefore, the angle detection light is generated by the mirror 163, and the measurement beam 300 is generated by the half mirror 164. In the configuration of FIG. 13A, it is also possible to display the same effect as in the fifth embodiment. However, there is a possibility that lights reflected from the angle detection markers 170 and lights reflected from the measurement target 301 are interfering with each other according to the distance up to the measurement target 301.

Figure 13B:
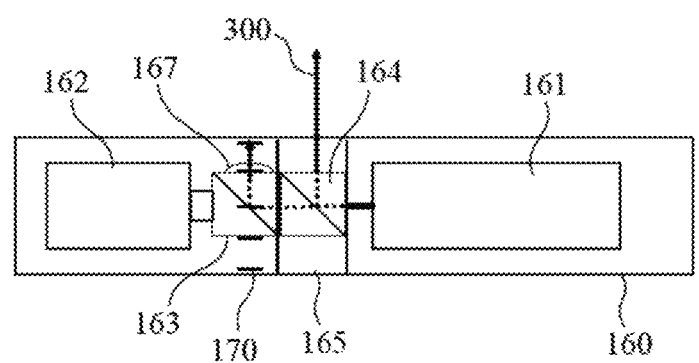
FIG. 13B illustrates an example of another configuration of the measurement probe 160 according to the seventh embodiment.

FIG. 13B illustrates an example of another configuration of the measurement probe 160 according to the seventh embodiment. In FIG. 13B, the position of the mirror 163 and the position of the half mirror 164 are changed compared to FIG. 5B, and thus the position of the angle detection markers 170 and the position of the lens 167 are changed. In the configuration of FIG. 13B, it is possible to display the same effect as in FIG. 5B. However, similar to FIG. 13A, there is a possibility that lights reflected from the angle detection markers 170 and lights reflected from the measurement target 301 are interfering with each other according to the distance up to the measurement target 301.

Summary of Present Invention

In the three-dimensional shape measurement apparatus according to the present invention, the measurement beam 300 branches off, hits on the angle detection markers 170 (or the angle detection disk 175) as the angle detection light, and is detected together with the measurement light. Therefore, it is possible to measure a three-dimensional shape after correcting an angle error of the measurement beam 300 without increasing the optical fibers/signal wirings/detectors for angle detection. In addition, it is possible to suppress errors generated because the measurement beam 300 is simultaneously used to perform angle detection.

Modified Example of Present Invention

The present invention is not limited to the above-described embodiments, and various modified examples are included. For example, the above-described embodiments are described in detail in order to easily understand the present invention, and it is not necessary to include the described whole configurations. In addition, it is possible to replace a part of a configuration in an embodiment with a configuration of another embodiment, and it is possible to add the configuration of another embodiment to a certain embodiment. In addition, it is possible to perform addition, removal, and replacement of another configuration for a part of the configuration of each embodiment.

The half mirror 164 may be a beam splitter. The mirror 163 may be a reflecting prism. That is, it is possible to use arbitrary optical elements which have the same function as the half mirror 164 and the mirror 163. In the above-described embodiments, the emission optical system/detection optical system 200 is formed as an integrated optical system which includes a round-trip optical path. However, it is possible to form the emission optical system/detection optical system 200 by dividing into two parts, that is, an optical system which emits the measurement light and an optical system which receives the detection light. It is possible to form the optical fiber 151 by dividing into two parts, that is, a fiber (emission optical fiber) which propagates the measurement light and a fiber (detection optical fiber) which receives the detection light.

In FIG. 7C, the focusing mechanism 190 is disposed after the angle detection light branches from the measurement light. The reason for this is that, in a case where the angle detection light is focused, a spot size of the angle detection light becomes small, and thus effect of deviation in the irradiation position becomes large. In a case of environment in which it is possible to ignore the effect, the angle detection light may be focused.

The angle extractor 212 may add correction with respect to a command signal of the motor driver 216 such that angle error data acquired by the motor driver 216 becomes small. Therefore, it is possible to measure a distance using a near angle at regular intervals. Furthermore, for example, a larger number of results of measurement may be acquired by delaying a rotation speed of the motor 162 for an area where a detection point is small such that it is possible to accurately detect the angle of the motor 162.

In a case where it is possible to appropriately reflect the angle detection light, states of the marks formed on the angle detection disk 175 may be arbitrary. For example, the marks may include plane marks, three-dimensional marks, and geometrical patterns. Other appropriate states may be included.

REFERENCE SIGNS LIST

101: laser source
102: oscillator
103: fiber coupler
104: fiber coupler
105: optical fiber
106: fiber coupler
107: light receiver
108: circulator
109: light receiver
109': spectroscope
110: optical switch
111: fiber coupler
112: reference mirror
150: control line
151: optical fiber
160: measurement probe
161: optical fiber collimator
162: motor
163: mirror
164: half mirror
165: transparent part
167: lens
168: circular mirror
169: mirror
170: angle detection marker
171: reflection film
175: angle detection disk
190: focusing mechanism
191: optical fiber coupler
192: lens
200: emission optical system/detection optical system
201: AD/DA converter
210: control device
220: display device
230: probe feeding mechanism
300: measurement beam
301: measurement target

The invention claimed is:

1. A three-dimensional shape measurement apparatus comprising:
   an emission optical system that emits a measurement light via an emission optical fiber;
   a detection optical system that detects a detection light via a detection optical fiber;
   an optical element that performs irradiation of the measurement light emitted by the emission optical system on a subject, and returns light, which is returned from the subject, to the detection optical fiber as the detection light;
   a rotation device that rotates a direction, in which the measurement light proceeds, by rotating the optical element;
   an angle detection light generation unit that generates an angle measurement light used to measure a rotation angle of the rotation device by causing a part of the measurement light emitted by the emission optical system to proceed in a direction which is different from a direction toward the subject; and
   an angle detection unit that returns the angle measurement light with respect to the detection optical fiber as an angle detection light indicative of a rotation angle of the rotation device;
   a probe housing that accommodates the optical element, the rotation device, and the angle detection light generation unit.

2. The three-dimensional shape measurement apparatus according to claim 1,
   wherein the angle detection unit is formed as marks which are formed in the probe housing in plural and reflect the angle measurement light, and
   wherein the angle detection light generation unit is formed as a beam splitter that rotates together with the optical element.

3. The three-dimensional shape measurement apparatus according to claim 1, further comprising:
   a focusing lens that rotates together with the beam splitter and causes the angle measurement light generated by the beam splitter to be focused with respect to the marks.

4. The three-dimensional shape measurement apparatus according to claim 1,
   wherein the rotation device is disposed between the detection optical system and the optical element, and is formed as a hollow motor that has a hole through which the measurement light and the detection light pass.

5. The three-dimensional shape measurement apparatus according to claim 1,
   wherein the angle detection unit is formed as an angle detection plate that has a surface formed with the marks which reflect the angle measurement light, and
   wherein the angle detection light generation unit is formed as a diffraction grid that is formed in the optical element and diffracts a part of the measurement light toward the angle detection plate.

6. The three-dimensional shape measurement apparatus according to claim 1,
   wherein the emission optical system includes
   first and second measure optical fibers that propagate the measurement light and have different lengths from each other, and
   a measurement light switch that switches a propagation path of the measurement light between the first and second measure optical fibers.

7. The three-dimensional shape measurement apparatus according to claim 1,
   wherein the detection optical system includes
   a laser that generates the measurement light, a coupler that causes a part of the measurement light to branch off as a reference light, first and second reference optical fibers that propagate the reference light and have different lengths from each other, and a reference light switch that switches a propagation path of the reference light between the first and second reference optical fibers.

8. The three-dimensional shape measurement apparatus according to claim 1, further comprising:

a computation unit that measures a three-dimensional shape of the subject based on the detection light detected by the detection optical system.

9. The three-dimensional shape measurement apparatus according to claim 8, wherein the computation unit measures the three-dimensional shape of the subject by calculating a distance up to the subject based on the detection light, and wherein the computation unit detects the rotation angle by separating a component, which is reflected from the angle detection unit, of the detection light from a component, which is reflected from the subject, according to the distance calculated based on the detection light.

10. The three-dimensional shape measurement apparatus according to claim 1, wherein the emission optical system and the detection optical system are formed as an integrated optical system, and wherein the emission optical fiber and the detection optical fiber are the same optical fiber.

11. A three-dimensional shape measurement apparatus comprising:

an emission optical system that emits a measurement light via an emission optical fiber;

a detection optical system that detects a detection light via a detection optical fiber;

an optical element that performs irradiation of the measurement light emitted by the emission optical system on a subject, and returns light, which is returned from the subject, to the detection optical fiber as the detection light;

a rotation device that rotates a direction, in which the measurement light proceeds, by rotating the optical element;

an angle detection light generation unit that generates an angle measurement light used to measure a rotation angle of the rotation device by causing a part of the measurement light emitted by the emission optical system to proceed in a direction which is different from a direction toward the subject; and an angle detection unit that returns the angle measurement light with respect to the detection optical fiber as an angle detection light indicative of a rotation angle of the rotation device;

a probe housing that accommodates the optical element, the rotation device, and the angle detection light generation unit, wherein the angle detection unit is formed as an angle detection plate that is formed with marks which reflect the angle measurement light, wherein the angle detection light generation unit is formed as a beam splitter that rotates together with the optical element, and wherein, on a surface of the probe housing, a mirror is disposed that reflects the angle detection light generated by the beam splitter toward an angle detection plate.

12. The three-dimensional shape measurement apparatus according to claim 11, further comprising:

a focusing mechanism that focuses the measurement light, wherein the focusing mechanism is disposed between the subject and the angle detection light generation unit.

13. A three-dimensional shape measurement apparatus comprising:

an emission optical system that emits a measurement light via an emission optical fiber;

a detection optical system that detects a detection light via a detection optical fiber;

an optical element that performs irradiation of the measurement light emitted by the emission optical system on a subject, and returns light, which is returned from the subject, to the detection optical fiber as the detection light;

a rotation device that rotates a direction, in which the measurement light proceeds, by rotating the optical element;

an angle detection light generation unit that generates an angle measurement light used to measure a rotation angle of the rotation device by causing a part of the measurement light emitted by the emission optical system to proceed in a direction which is different from a direction toward the subject; and an angle detection unit that returns the angle measurement light with respect to the detection optical fiber as an angle detection light indicative of a rotation angle of the rotation device;

wherein the angle detection unit is formed as an angle detection plate that is formed with marks which reflect the angle measurement light, and wherein the angle detection light generation unit includes a coupler that generates the angle measurement light by causing the measurement light to branch off, a branching optical fiber that propagates the measurement light, which is caused to branch off by the coupler, toward the angle detection plate, and a lens that is disposed at a tip of the branching optical fiber and performs irradiation of the angle measurement light toward the angle detection plate.

14. A three-dimensional shape measurement probe comprising:

an optical element that performs irradiation of a measurement light on a subject and returns light, which is returned from the subject, to a detection optical fiber as a detection light;

a rotation device that rotates a direction in which the measurement light proceeds by rotating the optical element;

an angle detection light generation unit that generates an angle measurement light used to measure a rotation angle of the rotation device by causing a part of the measurement light to proceed in a direction which is different from a direction toward the subject;

an angle detection unit that returns the angle measurement light with respect to the detection optical fiber as an angle detection light indicative of a rotation angle of the rotation device; and a probe housing that accommodates the optical element, the rotation device, and the angle detection light generation unit.

* * * * *